(12) United States Patent
Jacquard (10) Patent No.: US 12,405,479 B2
(45) Date of Patent: Sep. 2, 2025

(54) DEVICE FOR PROCESSING A LIGHT BEAM VIA A MULTI-PLANE CONVERTER WITH A VIEW TO FORMING IT INTO A PREDETERMINED SHAPE

(71) Applicant: CAILabs, Rennes (FR)

(72) Inventor: Clément Jacquard, Rennes (FR)

(73) Assignee: CAILabs, Rennes (FR)

( * ) Notice: Subject to any disclaimer, the term of this patent is extended or adjusted under 35 U.S.C. 154(b) by 628 days.

(21) Appl. No.: 17/759,745

(22) PCT Filed: Jan. 25, 2021

(86) PCT No.: PCT/FR2021/050123
§ 371 (c)(1),
(2) Date: Jan. 25, 2023

(87) PCT Pub. No.: WO2021/152245
PCT Pub. Date: Aug. 5, 2021

(65) Prior Publication Data
US 2023/0141335 A1  May 11, 2023

(30) Foreign Application Priority Data
Jan. 29, 2020  (FR) ..................... 2000880

(51) Int. Cl.
*G02B 27/09* (2006.01)
*H01S 3/00* (2006.01)

(52) U.S. Cl.
CPC ..... *G02B 27/0927* (2013.01); *G02B 27/0977* (2013.01); *H01S 3/0057* (2013.01)

(58) Field of Classification Search
None
See application file for complete search history.

(56) References Cited

U.S. PATENT DOCUMENTS

| 492,931 A | 3/1893 | Baird |
|---|---|---|
| 4,928,316 A | 5/1990 | Heritage et al. |
| (Continued) | | |

FOREIGN PATENT DOCUMENTS

| FR | 3076357 B1 | 10/2021 |
|---|---|---|
| WO | 2021/069716 A1 | 4/2021 |

OTHER PUBLICATIONS

Fontaine et al., Design of High Order Mode-Multiplexers using Multiplane Light Conversion, 2017 European Conference on Optical Communication (ECOC), Sep. 17-21, 2017, 3 pages.

(Continued)

*Primary Examiner* — Nicholas J Lee
(74) *Attorney, Agent, or Firm* — TraskBritt (57) ABSTRACT

A device for processing an input light beam comprising at least one optical pulse having an original duration, forms the input light beam into a predetermined shape. The device comprises an optical input; a stretching device, with a view to temporally elongating the duration of the optical pulse and thus transmitting a temporally stretched radiation; a compressing device, with a view to at least partially restoring the original duration of the optical pulse; and an optical output. The processing device also comprises a shaping device comprising at least one multi-plane converter placed upstream of the compressing device, which is configured to process the temporally stretched radiation with a view to forming the output beam into the predetermined shape.

20 Claims, 1 Drawing Sheet

(56) References Cited

U.S. PATENT DOCUMENTS

| | | | | |
|---|---|---|---|---|
| 5,235,606 | A | * | 8/1993 | Mourou ............... H01S 3/2316 |
| | | | | 372/20 |
| 6,272,156 | B1 | * | 8/2001 | Reed .................... H01S 3/0057 |
| | | | | 372/102 |
| 9,250,454 | B2 | | 2/2016 | Morizur et al. |
| 2010/0103489 | A1 | * | 4/2010 | Moser ............... G02B 27/0944 |
| | | | | 359/15 |
| 2017/0010463 | A1 | | 1/2017 | Morizur et al. |
| 2017/0093111 | A1 | * | 3/2017 | Hooker ................ H01S 3/0057 |
| 2019/0305501 | A1 | * | 10/2019 | Yu ............................ H01S 3/10 |

OTHER PUBLICATIONS

European Office Action for Application No. 21705597.9 dated Oct. 9, 2023, 12 pages with machine translation.

Delaubert et al., Quantum Measurements of Spatial Conjugate Variables: Displacement and Tilt of a Gaussian Beam, Optics Letters, vol. 31, Issue 10, pp. 1537-1539.

Häfner et al., Tailored Laser Beam Shaping for Efficient and Accurate Microstructuring, Applied Physics A Materials Science & Processing, vol. 124, (2018), 9 pages.

International Search Report for International Application No. PCT/FR2021/050123 dated Apr. 26, 2021, 3 pages.

International Written Opinion for International Application No. PCT/FR2021/050123 dated Apr. 26, 2021, 6 pages.

Morizur et al., Programmable Unitary Spatial Mode Manipulation, J. Opt. Soc. Am. A, vol. 27, No. 11, (Nov. 2010), pp. 2524-2531.

Mounaix et al., Time Reversed Optical Waves by Arbitrary Vector Spatiotemporal Field Generation, Advances in Resist Technology and Processing XVI, S P I E—International Society for Optical Engineering, vol. 11200, (Dec. 30, 2019, pp. 112001R-112001R.

* cited by examiner

DEVICE FOR PROCESSING A LIGHT BEAM VIA A MULTI-PLANE CONVERTER WITH A VIEW TO FORMING IT INTO A PREDETERMINED SHAPE

CROSS-REFERENCE TO RELATED APPLICATIONS

This application is a national phase entry under 35 U.S.C. § 371 of International Patent Application PCT/FR2021/050123, filed Jan. 25, 2021, designating the United States of America and published as International Patent Publication WO 2021/152245 A1 on Aug. 5, 2021, which claims the benefit under Article 8 of the Patent Cooperation Treaty to French Patent Application Serial No. 2000880, filed Jan. 29, 2020.

TECHNICAL FIELD

The present disclosure relates to an optical device for processing a light beam comprising a multi-plane converter, the optical device aiming to shape this beam and to form it into a predetermined shape.

BACKGROUND

There are many applications where the spatial shaping of a beam that propagates in free space, that is to say, forming this beam so that it has a predetermined spatial shape, may be relevant. These applications include:
  Machining, drilling, precision cutting and surface treatment, ablation or functionalization of materials by laser, typically a pulse laser,
  Imaging, and, in particular, microscopy,
  Coupling in functional optical media such as waveguides, amplifier or converter media,
  LIDAR detection,
  Free-space optical communications.

This spatial shaping of the light beam can be implemented by multiple means, for example, by employing optical elements such as imaging optical elements, diffractive elements, phase modulators, or non-spherical and non-planar optical elements, such as aspherical or freeform optical elements ("freeform optics"). As such, reference may be made to the document "Tailored laser beam shaping for efficient and accurate microstructuring," Applied Physics A, Material Science & Processing, dated Oct. 1, 2018. There are also optical devices for converting multi-plane light (and more succinctly referred to as "multi-plane converter" in the remainder of this description) known from U.S. Pat. No. 9,250,454 and US2017010463, designated by the acronym MPLC (Multi-Plane Light Conversion), making it possible to carry out any unitary spatial transformation of light radiation.

From a theoretical point of view, and as was established in "*Programmable unitary spatial mode manipulation*," Morizur et Al, *J. Opt. Soc. Am. A/Vol.* 21, *No.* 11/November 2010, a unitary spatial transformation can effectively be broken down into a succession of primary transformations, each primary transformation affecting the transverse phase profile of the light radiation. In practice, and without this forming any limitation of this technology, a multi-plane converter typically applies between 3 and 25 primary transformations.

As documented in patent application FR3076357, implementing a multi-plane converter requires arranging optical parts together with great precision, the tolerances of which parts are very tight. For example, when the converter is implemented in the form of a multipass cavity comprising a reflective phase plate as described in the aforementioned application, this phase plate must have as high a flatness as possible, and the arrangement of this plate with respect to the other optical parts of the converter must be of the order of a micrometer and a microradian. The assembly must also be very robust for use thereof in an industrial environment, and must be capable of withstanding high-intensity thermal and mechanical stresses (vibrations or turbulence of the surrounding air). Forming a more compact converter, implementing smaller optical parts that are arranged closer to each other, can contribute to solving this general problem. However, this search for compactness is limited by the size of the microstructured zones on which the beam is reflected and transformed, as well as by the free-space propagation distance of the beam necessary to complete the optical transformation. To remove this limitation along both the transverse and longitudinal dimensions, it is necessary to reduce the size of the beam.

Reducing the size of the beam leads to densifying the spatial distribution of its energy. This increase in density can be amplified locally when, as is the case in a multi-plane converter, the shaping of the beam is based on an iterative modification of its spatial profile, which affects the spatial distribution of its energy during these iterations. The fluence, that is to say, the surface energy density on the optical parts that make up the converter, can locally become very high and exceed the damage limits of these parts.

This problem arises particularly when the light beam is formed by a train of very short pulses, from a few femtoseconds to a few tens of nanoseconds, leading to fluences per pulse that can exceed the ablation threshold of the materials making up the optical parts, this threshold typically being of the order of a fraction of $J/cm^2$ for femtosecond pulses to a few $J/cm^2$ for nanosecond pulses. Choosing stronger materials to form these parts or providing a protective coating can be very expensive to implement, if not impossible.

It is an object of the present disclosure to address this problem at least in part. More specifically, an object of the present disclosure is to provide a device for shaping a light beam comprising a multi-plane converter, the beam being formed by at least one optical pulse and the converter being able to be produced in a compact manner, so as to facilitate its manufacture and improve its robustness during its use, while limiting its cost.

BRIEF SUMMARY

An object of the present disclosure is to propose a device for processing an input light beam comprising at least one optical pulse having an original duration, the processing device aiming to form the input light beam into a predetermined shape.

According to the present disclosure, the processing device comprises:
  an optical input for receiving the input light beam;
  a stretching device with a view to temporally elongating the duration of the optical pulse by spectral spreading of the input light beam and thus propagating a temporally stretched radiation;
  a compressing device with a view to at least partially restoring the original duration of the optical pulse;
  an optical output, arranged downstream of the compressing device, with a view to propagating an output beam;

a shaping device, comprising at least one multi-plane converter placed upstream of the compressing device, which is configured to process the temporally stretched radiation with a view to forming the output beam into the predetermined shape.

Lengthening the duration of the optical pulse makes it possible to reduce the size of the beam and to propose a compact multi-plane converter, which facilitates its manufacture and improves its robustness. This effect is all the more marked as the propagation distances necessary to carry out the optical transformation, and therefore the longitudinal dimension of the converter, change quadratically with the size of the beam.

According to other advantageous and non-limiting features of the present disclosure, taken individually or in any technically feasible combination:
- the shaping device further comprises at least one diffractive optical element, a spatial phase modulator, an optical system comprising at least one lens, one axicon or one non-spherical and non-planar optical element;
- the non-spherical and non-planar optical element is a reflective optical element;
- the multi-plane converter is configured to spatially separate, in a separation plane, the temporally stretched radiation into useful radiation, in a target mode, and into interference radiation, and the shaping device also comprises at least one interference radiation blocking device, arranged in the separation plane so that it does not contribute to the output beam;
- the processing device comprises a plurality of blocking devices arranged respectively in a plurality of separation planes in which a part of the interference radiation is spatially isolated;
- the blocking device comprises at least one absorbing, diffusing or reflecting optical element;
- the processing device comprises at least one optical amplifier arranged between the stretching device and the compressing device;
- the multi-plane converter is arranged downstream of an optical amplifier;
- the multi-plane converter is arranged upstream of an optical amplifier;
- the optical amplifier is integrated into the multi-plane converter;
- the shaping device comprises a first part arranged upstream of the compressing device, and a second part arranged downstream of this device.

According to another aspect, the object of the present disclosure proposes an optical system comprising a source emitting an input light beam comprising at least one optical pulse having an original duration and a processing device as described above.

Advantageously, the original duration of the optical pulse is between 1 femtosecond and several nanoseconds, and preferably less than 1 picosecond.

BRIEF DESCRIPTION OF THE DRAWINGS

Other advantages and particularities of the present disclosure will become apparent on reading the detailed description of implementations and embodiments, which are in no way limiting, with regard to the accompanying drawings, in which.

DETAILED DESCRIPTION

Definitions

For the sake of clarity, in the present disclosure light radiation or a light beam is defined as radiation formed from at least one mode of the electromagnetic field, each mode forming a spatio-frequential distribution of the amplitude, phase, and polarization of the field. Accordingly, the modification or transformation of the phase of the light radiation refers to the modification or spatio-frequential transformation of each of the modes of the radiation.

For the sake of simplification, it will be considered in the present description that the radiation and/or beams are polarized in a single direction. However, the principles set out are entirely applicable to radiation or to a beam having more than one direction of polarization.

The "shape" of radiation or of a beam means the transverse distribution of the amplitude and the phase of the mode or the combination of the transverse amplitude and phase distributions of the modes making up this radiation. It is therefore the spatial form of the radiation or the beam.

The term "spatial parameters of the light beam," or more simply "parameter of the light beam," denotes the scalar parameters defining the amplitude and phase distributions associated with the electromagnetic field. Examples of such spatial parameters include the following parameters:
- the direction of propagation of the light beam, defined by means of the average linear phase of the associated electromagnetic field;
- the position of the light beam, defined as the position of the center of gravity of the beam intensity distribution in a plane perpendicular to the direction of propagation of the beam;
- the horizontal or vertical size of the light beam, defined as the standard deviation of the horizontal or vertical marginal intensity distribution (as defined by the international ISO standard);
- the ellipticity of the beam;
- the divergence of the beam, which may possibly be anisotropic.

For the sake of completeness, the operating principles of a multi-plane converter are recalled. In such a device, an incident light beam undergoes a succession of reflections and/or shaping, each reflection and/or shaping being followed by free-space propagation of the beam. At least some of the optical parts on which the reflections and/or the transmissions take place, generally in distinct successive locations, and which guide the propagation of the incident beam, have a microstructured surface that modifies the phase of the incident light beam in order to give it a predetermined optical function. Thus, generally at least 4 reflections and/or transmissions are provided, such as 8, 10, 12, 14, or even at least 20 reflections and/or transmissions, for example. Advantageously, the shape of the incident light radiation and of the modified light radiation are different from each other. The documents "Programmable unitary spatial mode manipulation," Morizur et Al, J. Opt. Soc. Am. A/Vol. 27, No. 11/November 2010; N. Further Fontaine et Al, (ECOC, 2017), "Design of High Order Mode-Multiplexers using Multiplane Light Conversion"; U.S. Pat. No. 9,250,454 and US2017010463 contain the theoretical foundations and examples of practical implementation of such a multiplane converter.

The term "microstructured surface" means that the surface of the optical part can have a relief, for example, in the form of "pixels" whose dimensions are between a few microns to a few hundred microns. The relief or each pixel of this relief has a variable elevation relative to a mean plane defining the surface in question, ranging from a few hundred nanometers at most to a few hundred microns at most, in absolute value. An optical part having such a microstructured surface forms a phase mask introducing local phase shifts within the cross-section of the light beam that is reflected thereon or that is transmitted therein.

Application

Figure 1:
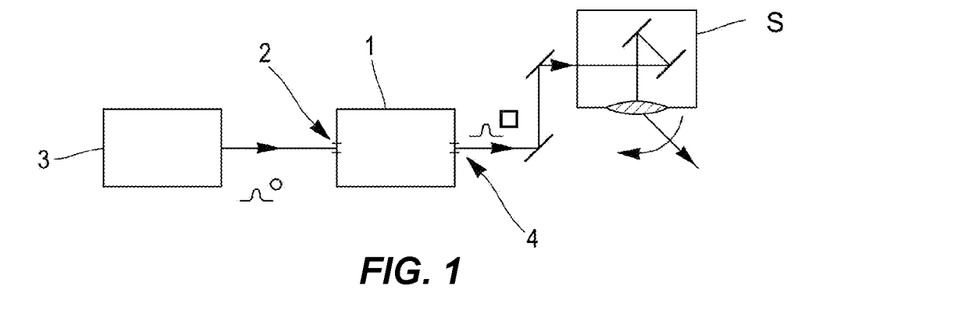
FIG. 1 shows an example of application of a processing device according to the present disclosure.

In the introduction to this description, and by way of illustration of the needs that led to the present disclosure, FIG. 1 shows an example of application of a processing device 1 according to the present disclosure in the field of machining and surface treatment.

Such a device 1 has an optical input 2 for receiving an input light beam from an optical source 3, for example, a pulsed laser source. The input beam comprises at least one optical pulse having a determined duration. Conventionally, the input beam is formed by a train of pulses of substantially identical durations, the pulses of the train having a determined repetition frequency, but the present disclosure is in no way limited to this conventional configuration. A processing device 1 according to the present disclosure is of particular interest when the source is configured to generate an input beam having pulses whose determined duration is very short, for example, of the order of magnitude of femtoseconds (from 1 femtosecond to 1 picosecond). The repetition frequency of these pulses is typically between a few kHz and 1 MHz, for example, of the order of 100 kHz. The energy of an optical pulse generated by the source, in particular, when the input beam has been amplified beforehand, can reach values of the order of a micro Joule to several millijoules.

The size of the beam at the optical input 2 of the device has a value preferably less than 180 microns, preferably less than 130 microns, or even 100 microns. The beam can be processed in this way using compact devices. For completeness, it is recalled that the optical spectrum of such an ultra-short pulse is not monofrequency, as may be the case for a continuous beam, and this spectrum therefore has a certain spectral width.

The processing device 1 also has an optical output 4 to emit an output light beam. In the illustration of FIG. 1, the optical input and output 2, 4 comprise a single passage allowing free-space propagation of the beams, but provision could be made for one and/or the other of this input and this output to be formed by a connector or an optical stage, for example, making it possible to couple the processing device 1 to at least one input and/or one output optical fiber.

As will be detailed later in this description, the main function of the processing device 1 is to form the output light beam into a predetermined shape. In the example shown in FIG. 1, the input beam has a Gaussian shape, symbolized by a circle in this figure, and the output beam has a so-called "top hat" shape, symbolized by a square. The shape of the output light beam is usually different from that of the input light beam, but this is not necessarily always the case. Indeed, the processing device 1 can seek to make the shape of an input beam stable and invariant, when the latter is liable to vary over time, without necessarily seeking to modify the nominal shape of this beam. These variations can correspond to an instability of the source or to a relative displacement of the source with respect to the other elements of the system, this displacement, for example, being able to be caused by vibrations or by another type of mechanical interaction with the system environment. These variations cause a parameter of the beam emitted by the source to vary, and the processing device 1 can seek to compensate for this variation.

In the application example of FIG. 1, the processing device is connected to a scanning device S, making it possible to orient the output beam in a controlled manner, to direct it toward a part that is to be processed and to scan the surface. For this purpose, the scanning device S, symbolized here by two mirrors, can comprise a plurality of mobile mirrors whose orientation is controlled by a control device, not shown, so that the output beam follows a predetermined trajectory. The scanning device S can comprise other optical parts, such as lenses, in order to image the output light beam on the part to be treated.

Depending on the nature of the processing of the part, it may be preferred to project a beam onto this part having one given shape rather than another. The present disclosure therefore provides for supplying a processing device to implement this controlled shaping of the beam.

Processing Device

Figure 2:
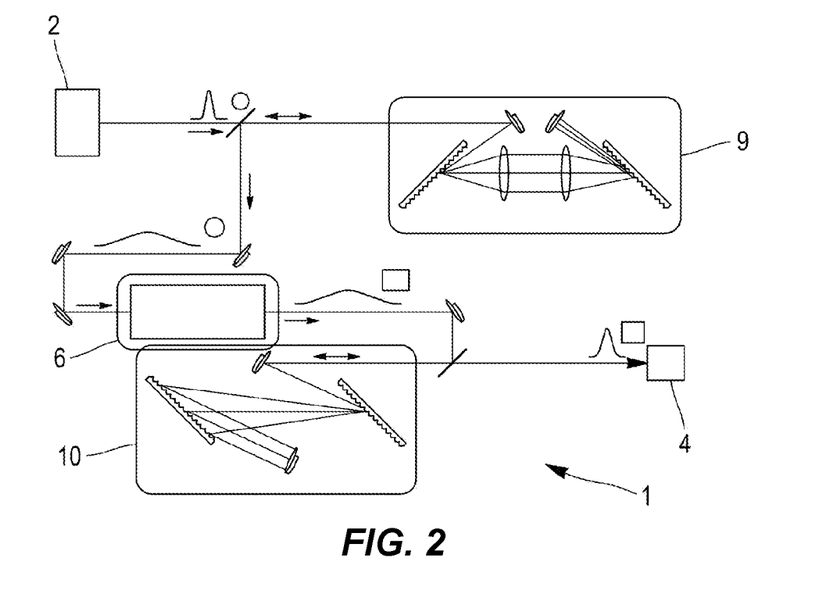
FIG. 2 schematically shows a processing device according to the present disclosure.

Referring to FIG. 2, the general architecture is now described of an embodiment of the processing device 1. In addition to the optical input 2 and the optical output 4 that have already been described, such a device comprises, downstream of the optical input 2, a stretching device 9 to temporally elongate the duration of the optical pulses of the input beam. Such a stretching device tends to introduce a controlled delay (phase shift) between the different optical frequencies of the input beam to supply and propagate radiation, referred to in the remainder of this description as "temporally stretched radiation." This temporally stretched radiation therefore presents pulses whose duration can be up to 100 or 1000 times greater than the original duration of the pulses of the input beam. Consequently, the peak power of the pulses making up the temporally stretched radiation is greatly reduced. The shape of the input beam is not particularly affected by the stretching device 9, such that an input beam, for example, having a Gaussian shape will lead to the formation of a temporally stretched radiation that also has an essentially Gaussian shape. Note that in general, the time spread of the "stretched" pulse must be less than the repetition period of this pulse (when the beam from the source 3 is composed of such a repetition of pulses), to avoid temporally superimposing a plurality of pulses after this processing.

There are many ways to make such a stretching device 9. FIG. 2 presents an embodiment based on a pair of diffraction gratings, a pair of lenses and a plane mirror. This arrangement, as is well known per se (see, in particular, the document US492931), makes it possible to introduce a spreading over time of the pulses without introducing any spatial transformation. Alternative arrangements are possible by replacing, for example, the second half of the device with a plane mirror so as to effect a folding. It would of course be possible to envisage other embodiments for carrying out this time spreading of the pulses making up the input beam, for example, based on optical prisms or fiber or volume Bragg gratings.

Continuing the description of FIG. 2, the processing device 1 also comprises a compressing device 10, arranged downstream of the stretching device 9 and upstream of the optical output 4. This device aims to restore (at least in part) the original duration of the optical pulse, by carrying out processing inverse to that of the stretching device, that is to say, by eliminating at least part of the controlled delay introduced between the different optical frequencies of the original pulse. It supplies an output beam, comprising a train of pulses whose duration is similar to the duration of the pulses of the input beam, or even reduced with respect to the original duration of the pulses of the input beam. This output beam is directed toward the optical output 4 of the processing device 1.

Similar to the stretching device 9, one embodiment of the compressing device may comprise two diffraction gratings placed parallel to one another and facing one another and a mirror arranged so that the beam makes a round-trip optical path between these two gratings. Other embodiments are possible, in particular, based on optical prisms or fiber or volume Bragg gratings.

The radiation propagating in the processing device 1, between the stretching device 9 and the compressing device 10, is therefore formed by pulses whose duration is much greater than that of the original pulses of the input beam and whose peak power is much less. This radiation can therefore be processed, in order to be shaped, by relatively small and inexpensive conventional optical parts. It is therefore possible, to a certain extent, to reduce the size of the input beam or to preserve a beam of reasonable size, which makes it possible to give a compact shape to the shaping device 6, in particular, when the latter comprises a multi-plane converter, as will be detailed in a later section of this disclosure.

Continuing the description of the example shown in FIG. 1, arranged at least in part between the stretching device 9 and the compressing device 10, a processing device according to the present description comprises a shaping device 6 for processing the temporally stretched radiation from the stretching device 9 and producing radiation, referred to in the remainder of this description as "output radiation," having a predetermined shape. This output radiation is then propagated toward and processed by the compressing device 10, as described above, without affecting the shape of this radiation, so that the shaping device 6 has the effect of forming the output beam of the processing device into the predetermined shape.

Figure 3:
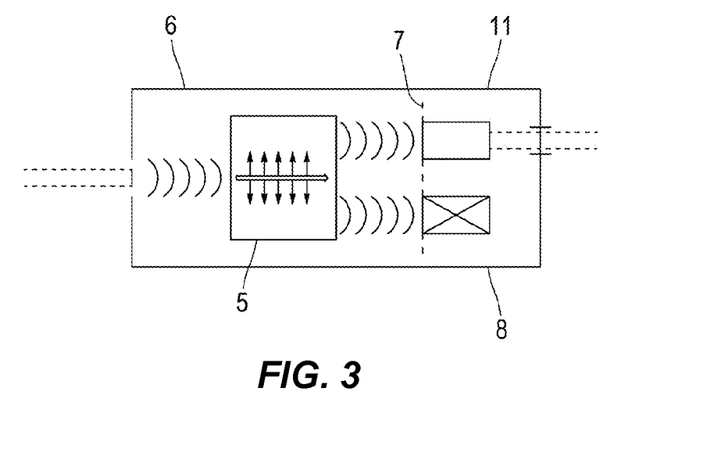
FIG. 3 shows a particular example of the processing device.

In the context of the present description, and with reference to FIG. 3, the shaping device 6 comprises a multi-plane converter 5, arranged upstream of the compressing device 10. This multi-plane converter 5 may have been configured to shape the beam so that the output beam has the determined shape and/or to stabilize the input beam, by modal filtering. It will be possible to rely on the references provided in an earlier passage of this description to configure the multi-plane converter so that it shapes the temporally spread radiation into radiation whose shape is different, contributing to the determined shape of the output beam. However, in addition to this multi-plane converter 5, the shaping device can also comprise an arrangement of optical elements 11 chosen from the following list to assist the transformations carried out by this converter 5:

- a Diffractive Optical Element (DOE);
- a Spatial Light Modulator (SLM);
- an imaging optical system or system comprising at least one lens;
- an axicon;
- a spherical mirror;
- at least one optical, transmissive or reflective, non-spherical and non-planar element, such as an aspherical or free-form optical element (from the expression "free-form optics").

Advantageously, these optical elements will be of the reflective type, since they have lower chromatic dispersion and higher power handling than an optical element of the transmissive type.

The multi-plane converter 5, possibly assisted by the optical elements 11 of the arrangement of the shaping device 6, are configured and arranged so that the output beam has the predetermined shape. This shape is chosen according to the needs of the application and can correspond, at the output of the processing device 1 or after free-space or guided propagation of the output beam, to, for example:

- a square or rectangular "Flat Top" beam;
- a circular "Flat Top" beam;
- a Bessel beam;
- a line-shaped top beam (produced by a flat top in a first direction and a Gaussian in a direction perpendicular to the first);
- a ring-shaped beam;
- or any other beam shape relevant to the concerned method.

To facilitate the shaping of the output radiation and to form a beam according to one of the shapes given as an example above, the shaping device 6 can include, in particular, at least one non-spherical and non-planar optical element, and preferably between 1 and 3 of these elements. The term "non-spherical and non-planar optical element" denotes an optical, transmissive or reflective element, the surfaces of which are neither spherical nor flat. It can be, for example, an aspherical optical element (which generally has a symmetry of revolution about an axis perpendicular to its mean plane) or a free-form optical element (which does not exhibit symmetry of revolution or of translation about an axis perpendicular to its mean plane).

A small number of such non-spherical and non-planar optical elements, from 1 to 3, makes it possible to shape output radiation into a wide variety of beam shapes, in particular, those given as an example above, which are of particular interest in applications for machining, drilling, precision cutting and surface treatment of materials by laser. This is particularly the case when the input beam of the device 1 is monomode.

Multi-Plane Modal Filter Converter

Advantageously, the shaping device 6 comprises a multi-plane converter 5 (MPLC) that makes it possible to ensure modal filtering of the temporally stretched radiation, that is to say, to separate and/or to extract unwanted spatial modal components from this radiation. These components can come from a variation over time of the shape of the beam coming from the source 3, or more generally from optical elements arranged upstream of the multi-plane converter, which it is therefore desired to stabilize.

Advantageously, this MPLC is arranged upstream of a possible arrangement of optical elements 11 aimed at shaping the output beam, or completing its shaping, as illustrated in FIG. 3.

Generally speaking, an MPLC makes it possible to transform a spatial transverse input mode base into an output mode base. To design an MPLC, it is therefore necessary to define these two bases. To implement modal filtering, the input base is determined from the assumed (or nominal) incident light radiation at the MPLC and knowledge of its possible variations. The output mode base of the MPLC is determined by the desired light radiation at the output of this device and by the nature of the means for extracting the optical power from the undesired modal components. The desired (or "useful") radiation mode at the output of the MPLC device 5 will be designated as the target mode.

By way of example, the following procedure can be followed in order to determine the input mode base of the MPLC 5, when the nominal temporally stretched radiation is monomode:

- define as nominal input mode, the closest possible mode to the mode of the temporally stretched radiation that will actually be used;
- construct a mode family from the nominal input mode, at least one of the spatial parameters of which is varied;
- construct a mode base from the mode family using a singular value decomposition;
- determine a first mode of the base, such as the mode of the base having maximum overlap with the assumed input mode;
- complete the first mode with the modes obtained during the singular value decomposition, then apply an orthonormalization process of these modes to form the input base.

While the input beam is produced by a multimode optical source 3, for example, through a multimode fiber, the input base of the MPLC 5 can be constructed from the modes of the source rather than by the method described above. The nominal input mode is then the modal component of the beam comprising the most optical power.

In all cases, the input mode base is made up of modes that are not entirely spatially disjointed.

It is known from the document "Quantum measurements of spatial conjugate variables: displacement and tilt of a Gaussian beam," V. Delaubert, Optics Letters, Vol. 31, Issue 10, pp. 1537-1539, (2006), that within the limit of small variations of a physical parameter of interest (for example, but not exclusively, the direction and/or the position of a light beam), part of the energy of the light beam is transferred to the higher order mode(s). Thus, in the case of a supposed Gaussian input mode, it could be decided to use a Hermite-Gaussian input base whose first mode is the assumed Gaussian input mode.

To determine the output mode base of the MPLC modal filtering device 5, a base is chosen for which there is a plane, called a separation plane in the present disclosure, in which the output modes other than the target mode are sufficiently spatially disjointed from the target mode so that these output modes can be blocked by, for example, an absorbing or diffusing optical element, or deflected by a reflecting optical element, it being understood that the target mode undergoes an arbitrarily low energy loss. For example, Gaussian output modes could be used, sufficiently spatially separated so that their overlap is zero, two by two and distributed linearly in the separation plane, in a triangle or a rectangle.

The MPLC modal filtering device 5 of a shaping device 6 according to the present disclosure is configured to transform the input mode base into the output mode base, in particular, ensuring that the assumed input mode is transformed into the target mode.

The optical blocking, diffusing or reflecting element (or more generally the blocking device 8) can be integrated into the shaping device 6. It can be integrated, in particular, into the MPLC 5, or physically separate from the latter, as is the case in the schematic illustration of FIG. 3. The MPLC 5 can be combined, in particular, with a detection element making it possible to collect the output modes of the MPLC 5 associated with the interference modes of the incident light beam with a view to their total or partial detection.

A multitude of transverse planes may exist in which the useful radiation and the interference radiation are spatially separated. In this case, it is possible to place the blocking device 8 in at least one of these planes, or to distribute the optical elements making up the blocking device 8 in a plurality of such planes.

In the case of a particular temporally stretched radiation, corresponding to a nominal temporally stretched radiation whereof at least one of the spatial parameters has been modified, the MPLC modal filtering device 5 performs a projection, in the mathematical sense of the term, of this particular radiation based on its input modes. The optical power in each input mode of the MPLC 5 is transferred to the associated output mode. In the absence of a variation in at least one of the spatial parameters, all of the optical power of the particular input light radiation is transferred by the MPLC 5 to the target mode. In the event of variation in parameters of the temporally stretched radiation with respect to the nominal parameters of this radiation, the optical power portion of the particular temporally stretched radiation in the nominal input mode, referred to as the useful power, is transferred by the MPLC 5 from the nominal input mode to the target mode in the form of useful radiation. The optical power portion of the particular temporally stretched radiation in the other input modes of the base, referred to as the non-useful power, is transferred by the MPLC 5 to the output modes, which are orthogonal to the target mode in the form of interference radiation. In other words, the MPLC is configured to spatially separate, in a separation plane 7, the temporally stretched radiation into useful radiation, in a target mode, which propagates toward the shaping elements of the arrangement of optical elements 11, and into interference radiation.

The optical power portion in the output modes of the MPLC 5 that are orthogonal to the target mode, that is to say, the interference radiation, can then be blocked by the blocking device 8, formed by, for example, an absorbing or diffusing optical element or by any optical collection element for total or partial detection.

The MPLC 5 thus constitutes a passive modal filter where, within the limit of small variations of the spatial parameters of the temporally stretched radiation, the optical power of the light radiation that is outside the nominal input mode is completely extracted.

The target mode (constituting the useful radiation) and the other modes (constituting the interference radiation) may not all be separable in a single separation plane. In this situation, it is possible to provide a plurality of separation planes, distant from each other by a propagation space, in which it is possible to successively isolate some of the other modes contributing to the interference radiation. In this case, a plurality of blocking devices 8 will be provided, which will be placed respectively in the separation planes, in order to block the part of the spatially isolated interference radiation in each plane.

The MPLC modal filtering device 5 device makes it possible to separate the useful power from the non-useful power, that is to say, the useful radiation from the interference radiation. It may be particularly advantageous to optimize the spatial parameters of the input light beam or of the temporally stretched radiation by maximizing and/or minimizing the useful power and/or the non-useful power, respectively. It is possible to use an active (motorized mirrors, or an acousto-optic device, for example) or inactive (mirrors with opto-mechanical mount) control device arranged upstream of the MPLC device 5, for example, integrated into the stretching device 9 or arranged between the source 3 and the processing device 1. If active alignment devices are used, their parameters are adjusted by means of a feedback loop, at least one of the input parameters of which would be the total or partial measurements of the useful and/or non-useful powers.

As already stated, the multi-plane converter 5 can both seek to shape, at least in part, the temporally stretched radiation and to modally filter this radiation. This is the case, in particular, when the multi-plane converter has been configured so that the target mode of the output base has a shape different from the nominal input mode of the input base. In this case, it is possible to design a single multi-plane converter successively or simultaneously implementing the function of modal filtering of the temporally stretched radiation and the function of shaping this same radiation, or part of this shaping.

Optical Amplifier

According to a particular embodiment, it is possible to place an optical amplifier between the stretching device 9 and the compressing device 10. Advantage is then taken of the fact that the radiation propagating between these two devices has a relatively low peak power to be injected into an optical gain medium. The optical amplifier can be implemented via any known technique, for example, a doped fiber amplifier, or a free-space amplifier where the gain medium is a transparent optical element. It can be, for example, a regenerative cavity and a multipass amplifier.

Several variants of this embodiment are possible.

Thus, it is possible to place the optical amplifier directly downstream of the multi-plane converter 5. The latter therefore processes a temporally stretched radiation coming from the stretching device 9 that therefore has a relatively low peak power, which makes it possible to limit its size.

Alternatively, it is also possible to envisage placing the optical amplifier upstream of the multi-plane converter 5. When the conversion device 5 of the shaping device 6 performs modal filtering, this particularly advantageous configuration makes it possible to eliminate any instabilities of the radiation induced by the optical amplifier. Although the energy of the temporally stretched radiation processed by the multi-plane converter is greater than the configuration of the previous variant, advantage is taken of the time stretching of the radiation to preserve the compact nature of the shaping device 6.

In another alternative, it is possible to exploit the presence of an optical amplifier in the processing device 1 to limit the energy of the input beam supplied by the source 3. In this case, it is then possible to provide for placing the multi-plane converter 5 between the optical input 2 and the stretching device 9.

It is also possible to envisage mixing the previous variants, by placing the multi-plane converter 5 between two optical amplifiers, a first optical amplifier being arranged upstream of the converter 5 (before or after the stretching device 9) and a second optical amplifier being arranged downstream of the converter 5, upstream of the compressing device 10.

Finally, it is also possible to provide a single device combining the beam shaping function with the amplification function. For example, this single device can be formed from a gain medium of a multipass cavity, passed through multiple times by the radiation. At least one of the reflective surfaces of the cavity can be provided with a plurality of microstructured zones implementing a multi-plane converter aimed at shaping the radiation in the cavity. To simplify the practical realization of this unique device, a limited number of microstructured zones (2 to 5) can be arranged on at least one of the reflective surfaces to intercept the radiation during its last reflections, before it is extracted from the cavity.

Alternatively, a single device can be formed based on a multi-passage cavity architecture as in the previous example, but in which at least one of the reflective surfaces would be formed by an aspherical, non-planar or freeform optical element. This shape would be designed and configured to shape the radiation and help give the output beam its predetermined shape.

In the case where the input beam consists of short pulses, for example, between 1 femtosecond and several nanoseconds (such as 5 ns), and preferably less than 1 picosecond, the processing device 1 becomes particularly relevant by:
- its compatibility with light beams of wide optical spectra;
- its compatibility with beams whose energies per pulse are high, while preserving a relatively small transverse dimension of the beam, which makes it possible to form a compact device;
- the robustness it provides with respect to changes in the spatial parameters of the input beam when a modal filtering device is provided;
- the small number of optical elements that make up the device ensures the stability of the spatial parameters of the produced beams, and the ease of manufacturing the device.

EXAMPLE

One embodiment is described below, making the advantages of the present disclosure very apparent.

A pulsed laser source emits an input light beam having a Gaussian shape and whose carrier frequency is in the visible or near infrared. This source delivers pulses with a duration of the order of a hundred femtoseconds with a repetition rate of the order of a few tens to a few hundreds of megahertz and energies per pulse of the order of ten nanojoules.

In some cases, it may be advantageous to lower the repetition rate to ten or a hundred kilohertz using an electrooptical or acousto-optical device that selects one pulse out of a hundred or a thousand, for example.

This input beam is introduced into the optical input 2 of a processing device 1 by free propagation. The pulses contained in the beam are temporally stretched using a stretching device 9 similar to the stretching device shown in FIG. 3 and composed of standard components, such as holographic diffraction gratings at 600 lines per millimeter and lenses with common focal lengths, for example, one hundred or two hundred millimeters. A temporally stretched radiation is then commonly obtained that has pulses whose duration is of the order of ten to a hundred picoseconds, that is to say, 100 to 1000 times longer than their original durations.

The pulses are then amplified using a free-space optical amplifier such as a regenerative cavity or a multipass amplifier, or the successive combination of these two solutions. The pulses thus obtained then contain an energy from a few tens of microjoules to a few tens of millijoules depending on the gain of each amplifier stage.

Following this optical amplification, spatial shaping of the amplified radiation is carried out using a shaping device 6 according to the device 6 described in relation to the description of FIGS. 2 and 3. The shaping device 6 here notably comprises a multi-plane conversion device 5 configured to stabilize the parameters of the radiation coming from the optical amplification stage, the propagation of the interference radiation then being blocked by an absorbing element. At the end of this processing, the useful radiation provided by the multi-plane conversion device has a stable and Gaussian form. This radiation is then put in the form of a flat square plate by an arrangement formed from 2 free-form reflective optics, and whose respective shapes have been designed to precisely perform this transformation.

Assuming that the radiation incident to the shaping device 6 is composed of 100 picosecond pulses each containing 1 millijoule with a repetition rate of 100 kilohertz, this radiation then has an average optical power of 100 watts. In the case of Gaussian incident radiation, and for a maximum fluence tolerated by the parts making up the shaping device 6 of 10 J/cm$^2$ for the pulse durations concerned, a size of the radiation incident to the shaping device 6 of 160 micrometers prevents any damage. For such a beam size, the multi-plane conversion device 5 can then be contained in a volume on the order of 250 cm$^3$.

The useful part of the radiation emitted by the shaping device 6 propagates and the pulses it contains are time-compressed using a compressing device 10 similar to that described in relation to the description of FIG. 2. Here it is composed of diffraction gratings similar to those of the stretching device 9 described above. The radiation pulses emitted by the compressing device 10 then reach a duration of the order of a hundred femtoseconds, 500 femtoseconds, for example. This radiation propagates toward the optical output to form the output beam, the shape of which is a square flat plate and the parameters of which are quite stable.

Under the same working hypotheses (i.e., incident radiation of Gaussian shape containing 500 femtosecond pulses of 1 millijoule each and a repetition rate of 100 kilohertz), using a shaping device 6 of the state of the art would have required that the radiation incident to the shaping device 6 have a minimum size of 1100 micrometers to avoid any damage to the optical parts. The multi-plane converter 5 of this counter-example would then have occupied a volume of the order of 5000 cm$^3$, twenty times greater than the multi-plane converter 5 of a shaping device 6 according to the present disclosure.

Of course, the present disclosure is not limited to the embodiment described and to its variants. It is possible to add variants without departing from the scope of the invention as defined by the claims.

The processing device 1 can provide optical elements other than those that have just been described. These may be, in particular, elements, such as the mirrors shown in FIG. 2, making it possible to guide the propagation of the optical radiation passing through the device 1 so that it is successively processed by its various component devices (stretching, compressing, transmission, amplifier device(s)).

Furthermore, provision can be made for the processing device 1 to comprise other optical elements aimed at shaping the beam, for example, placed downstream of the compressing device 10. The shaping device 6 then comprises a first part arranged upstream of the compressing device 10, and a second part arranged downstream of this compressing device 10. Care will be taken in this case to choose the optical elements of the second part of the shaping device 6 so that they are compatible with the energy delivered by the output beam.

The invention claimed is:

1. A device for processing an input light beam comprising at least one optical pulse having an original duration, the processing device configured to form the input light beam into a predetermined shape, the processing device comprising:

an optical input for receiving the input light beam;
a stretching device configured to temporally elongate a duration of the optical pulse by spectral spreading of the input light beam and propagate a temporally stretched radiation;
a compressing device configured to at least partially restore the original duration of the optical pulse;
an optical output, arranged downstream of the compressing device, configured to propagate an output beam; and
a shaping device, comprising at least one multi-plane converter located upstream of the compressing device, the shaping device configured to process the temporally stretched radiation and form the output beam into the predetermined shape.

2. The device of claim 1, wherein the shaping device further comprises at least one diffractive optical element, a spatial phase modulator, an optical system comprising at least one lens, one axicon, or one non-spherical and non-planar optical element.

3. The device of claim 2, wherein the shaping device comprises the non-spherical and non-planar optical element, and wherein the non-spherical and non-planar optical element is a reflective optical element.

4. The device of claim 3, wherein the at least one multi-plane converter is configured to spatially separate, in a separation plane, the temporally stretched radiation into useful radiation, in a target mode, and into interference radiation, and wherein the shaping device further comprises at least one interference radiation blocking device, arranged in the separation plane so that the interference radiation does not contribute to the output beam.

5. The device of claim 4, further comprising a plurality of blocking devices arranged respectively in a plurality of separation planes in which a part of the interference radiation is spatially isolated.

6. The device of claim 4, wherein the at least one interference radiation blocking device comprises an absorbing, diffusing or reflecting optical element.

7. The device of claim 4, further comprising at least one optical amplifier arranged between the stretching device and the compressing device.

8. The device of claim 7, wherein the multi-plane converter is arranged downstream of an optical amplifier.

9. The device of claim 7, wherein the multi-plane converter is arranged upstream of an optical amplifier.

10. The device of claim 7, wherein the at least one optical amplifier is integrated into the multi-plane converter.

11. The device of claim 4, wherein the shaping device comprises a first part arranged upstream of the compressing device, and a second part arranged downstream of this device.

12. An optical system, comprising:
a source emitting an input light beam comprising at least one optical pulse having an original duration; and
a processing device according to claim 1.

13. The system of claim 12, wherein the original duration of the optical pulse is between 1 femtosecond and several nanoseconds.

14. The system of claim 13, wherein the original duration of the optical pulse is less than 1 picosecond.

15. The device of claim 1, wherein the at least one multi-plane converter is configured to spatially separate, in a separation plane, the temporally stretched radiation into useful radiation, in a target mode, and into interference radiation, and wherein the shaping device further comprises at least one interference radiation blocking device, arranged in the separation plane so that the interference radiation does not contribute to the output beam.

16. The device of claim 15, further comprising a plurality of blocking devices arranged respectively in a plurality of separation planes in which a part of the interference radiation is spatially isolated.

17. The device of claim 15, wherein the at least one interference radiation blocking device comprises an absorbing, diffusing or reflecting optical element.

18. The device of claim 1, further comprising at least one optical amplifier arranged between the stretching device and the compressing device.

19. The device of claim 18, wherein the at least one optical amplifier is integrated into the multi-plane converter.

20. The device of claim 1, wherein the shaping device comprises a first part arranged upstream of the compressing device, and a second part arranged downstream of this device.

* * * * *